Patented May 20, 1941

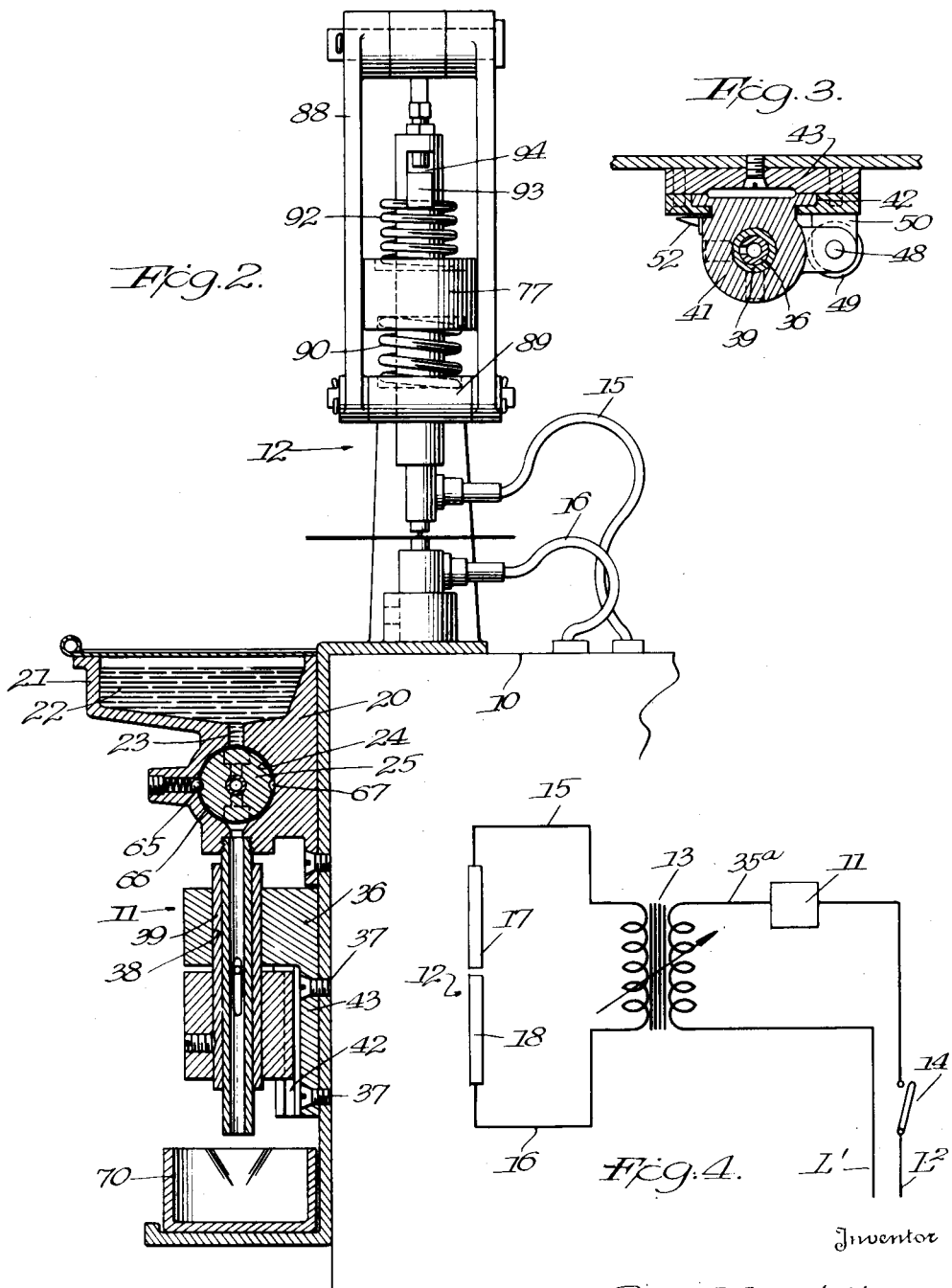

2,242,691

UNITED STATES PATENT OFFICE 2,242,691

ELECTRIC WELDING APPARATUS

Roy M. White, South Pasadena, Calif.

Application May 9, 1938, Serial No. 206,920

17 Claims. (Cl. 200—33)

The present invention relates to automatic electric welding apparatus. Although not confined to such work, the invention is particularly adapted for welding small stainless steel members of dental assemblies, in the initial manufacturing of such devices and in the repair of broken parts.

It is an object of the invention to provide an apparatus for electrically welding stainless steel and other highly resistant metals in such a manner as to avoid destroying the temper of the metals. In the prior art of welding this class of work, reliance has always been placed upon the human factor, in determining the pressure upon the work and the duration of the welding current for each weld. As a consequence, many faulty welds were made, particularly when working on light, delicate parts, by reason of the application of an incorrect pressure to the work between the electrodes, or by reason of too long or too short a period of time of welding current flow.

It will be understood that in welding stainless steel parts of dental assemblies, there is a definite relation between the value of the welding current, the pressure applied to the work and the duration of the welding current. If the steel is heated to excess, its temper is destroyed, and, since stainless steel is tempered by cold rolling, the lost temper cannot be restored by any heat treatment. In order to prevent undue heating of the parts and a consequent destruction of the temper, it is desirable to apply a relatively heavy welding current to the work for a very short time. However, the duration of the current flow, although of extremely short time, must be accurately determined. To this end, the invention contemplates an adjustable timer for electric welding currents, characterized by extreme accuracy, whereby minute time adjustments may be exactly determined and effected.

The invention also contemplates adjustable means for accurately determining the pressure applied to the work, thereby eliminating the human factor in this phase of the operation.

The invention further contemplates a new method of welding metals which are not highly resistant to the passage of electric current. In welding gold and gold alloys of low resistance, the method comprises inserting the gold parts between plates of relatively highly resistant metal such as stainless steel. When the welding current is passed through the assembly, the plates of resistant material are heated sufficiently to transmit a welding temperature to the gold parts, thereby securing them together.

In the accompanying drawings, a specific embodiment of the invention is disclosed, but it must be understood that the invention is not limited to the details of construction disclosed therein and described below.

In the accompanying drawings:

Figure 2 is an end elevation, partly in section, of the apparatus shown in Figure 1.

Figure 3 is a horizontal section taken on line 3—3 of Figure 1, and

Figure 4 is a circuit diagram.

Figure 1:
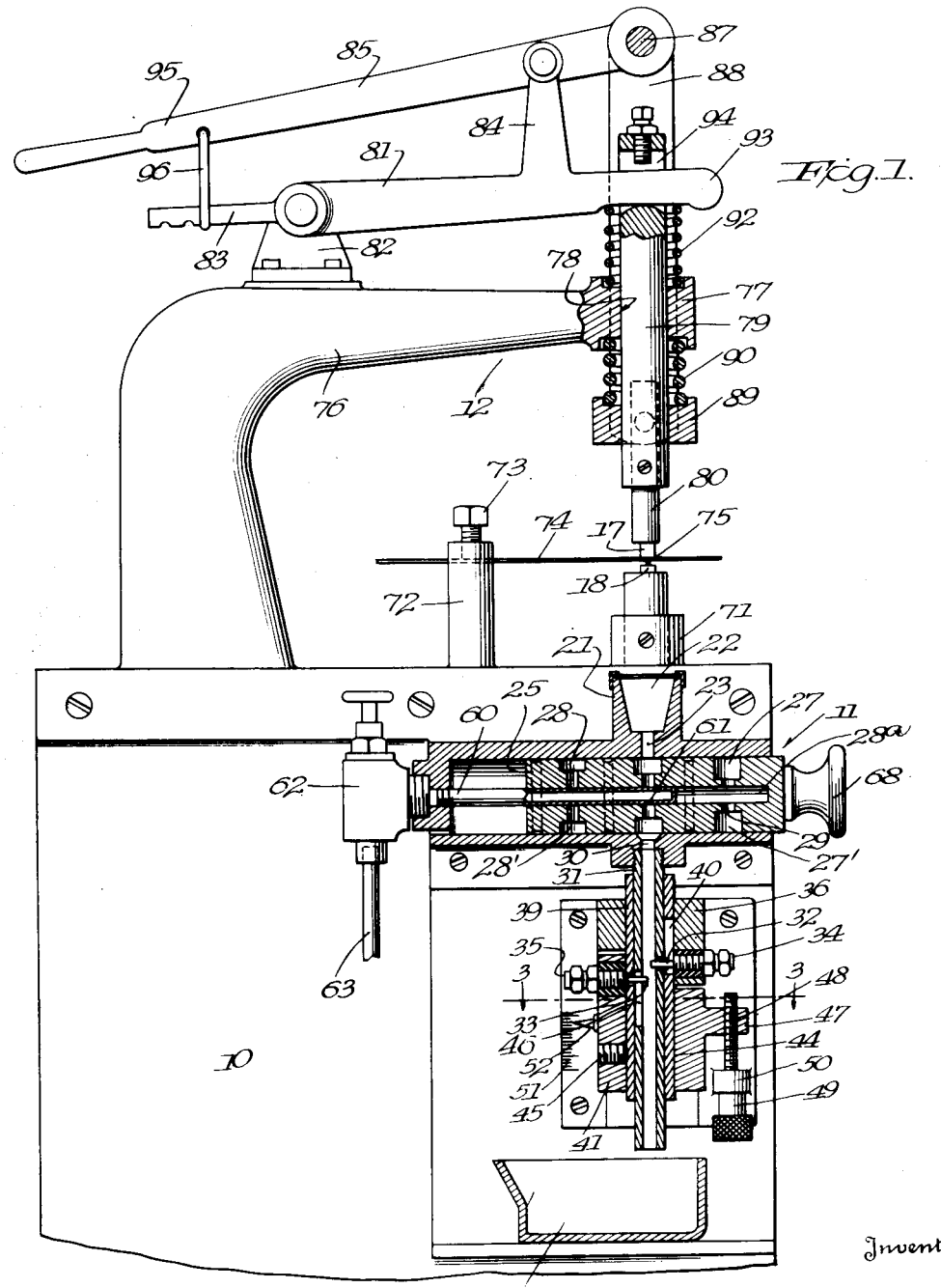
Figure 1 is a vertical section, partly in elevation, showing the timer for the welding current and the pressure applying means for the electrodes.

In the drawings, a transformer casing 10 supports, on its side, a mercury drip timer represented generally at 11. The top of the transformer casing supports the welding electrode assembly 12. The transformer 13 (Fig. 4) is disposed interiorly of the casing 10. Current from the lines L1, L2 is conducted through a conventional switch 14 and through the timer 11 to the primary side of the transformer 13. Lines 15, 16 lead respectively to the upper electrode 17 and the lower electrode 18. As a result of the inter-position of the timer 11 in the primary circuit of the transformer, the welding current may be accurately controlled thereby. The timer comprises an upper casing or distributor block 20 which may have its upper end formed to provide a reservoir 21, for a quantity of mercury or current conducting liquid 22. The reservoir has a downwardly opening passage 23 communicating with a central, horizontally disposed, cylindrical bore 24. In the bore, there is disposed a cylindrical block 25, similar to the body of a plug valve. The block is provided with a plurality of measuring receptacles 26, 26', 27, 27', 28, 28', each extending from its periphery to a central bore 28ᵃ. Each receptacle is provided with a reduced neck 29 at its inner end which is in communication with the aforesaid central bore. The receptacles are preferably arranged in sets of two or more, each member of a set being of the same size, but the receptacles of the different sets being of different volumes.

The casing 20, at its lower side, is provided with a downwardly facing opening 30, aligned with the passage 23. The opening 30 communicates with a discharge conduit 31, preferably threaded in an appropriate bore in the casing 20.

A pair of spaced contact elements 32, 33 are associated with the conduit 31, in position to be electrically connected by a body of current conducting liquid flowing downwardly under the influence of gravity through the conduit 31. The contact 32 may be connected by a binding post 34 with the main current line L2. The other contact is similarly connected at 35 by a line 35ᵃ to the transformer. Thus, when the contacts are electrically connected by a body of mercury or the like, the transformer will be energized and a welding current will flow to the welding electrodes.

As a means for varying the duration of time during which the contacts are so interconnected, the spacing of the contacts may be varied, or the volume of the body of mercury deposited into the conduit 31 may be varied, or both of these variable factors may be employed. Preferably, the space between the contacts may be changed by shifting their relative positions longitudinally, laterally, or rotationally. Any suitable construction for this purpose may be employed and the one shown in the accompanying drawings is illustrative only. A stationary block 36 is secured to the side face of the transformer block by screws 37 or the like. The block has a vertically disposed bore 38, in which a tubular sleeve 39 is slidably mounted. The sleeve is slotted at 40, to accommodate the fixed, upper contact element 32 which is mounted in the block 36 and projects through a wall of the conduit 31.

A lower bracket 41 is slidably mounted for vertical movement in ways 42 associated with a lower extension 43 of the stationary block. The sleeve 39 is secured in the bore 44 of the movable bracket 41 by set screws 45 or the like. An upwardly extending portion of the bracket 41 carries the lower contact element 33 and the latter projects through a slot 46 in the conduit 31. A lug 47, projecting laterally from the movable bracket, is provided with a threaded bore receiving a threaded shaft 48 attached to an adjusting nut 49 rotatably mounted in a lug 50 projecting forwardly from the lower portion 43 of the fixed bracket. A pointer 51 associated with the movable bracket registers with a gauge 52 adjacent thereto, so that the space between the contact elements may be accurately determined and adjusted by means of the adjusting screw 49.

Means are provided to facilitate the discharge of mercury or the like from the receptacles associated with the cylindrical block 25. A pipe 60 projects axially into the central bore 28ᵃ of the block 25. The pipe has a closed end and a downwardly facing discharge aperture 61, aligned with the opening 30 in the casing 20. The pipe 60 is connected at its other end through a valve 62 with a conduit 63, leading from a source of air under pressure.

The position of the cylindrical block 25 is determined by a spring-pressed ball 65 mounted in a bore in the upper casing. The ball rides in peripheral grooves 66 and seats in spherical recesses 67. By manipulating the handle 68, the cylindrical block 25 may be moved longitudinally until the ball seats in one of the grooves 66, whereupon the corresponding receptacles will be in the vertical plane of the passage 23 and the discharge opening 30. If the handle is rotated until the ball 65 is projected into one of the recesses 67, the operator will be advised of the fact that one receptacle is directly beneath the passage 23 in position to receive a charge of mercury from the reservoir. If the handle 68 and the cylindrical block 25 are now rotated through 180°, the filled cup will be positioned between the opening 61 in the air pipe 60 and the opening 30 communicating with discharge conduit 39, whereupon the mercury will be emptied into the conduit, its flow being facilitated by air admitted into the inverted, bottom end of the measuring cup. The individual cups of a set may be disposed 180° apart, or any other desired relation may be employed. Moreover, instead of employing the reservoir 21, a simple funnel of smaller capacity may be used to guide a body of mercury into each cup.

When the mercury is emptied into the conduit 31, it flows downwardly therethrough under the influence of gravity and eventually is collected in a receptacle 70. During its passage through the conduit, it bridges the space between the contact elements 32, 33, thereby completing the primary circuit of the transformer and initiating a flow of welding current to and through the electrodes 17, 18. The duration of time that the contact elements are so connected depends upon two principal factors, i. e., the spacing of the electrodes and the volume of the body of mercury. If the space between the contacts is increased, obviously it will take a longer time for the mercury to reach the lower element after contacting the upper one, and the mercury will break away from the upper contact more quickly thereafter, whereby the duration of circuit completion is reduced. On the other hand, if the contacts are moved closer together, they will remain connected in the electric circuit for a relatively longer period of time by the downwardly moving body of mercury.

If the volume of the body of mercury is increased, for instance, by using one of the measuring cups 27 or 27', it will take longer for that body to pass the two electrodes and an increase in the time of the welding current will result. On the contrary, if a smaller measuring cup 28 is used, the time of inter-connection of the contact elements will be reduced.

It should be understood that minute periods of time are being dealt with and extreme accuracy of time control is of paramount importance. The apparatus disclosed herein effects the desired accurate control of currents of minute duration with remarkable efficiency.

Any preferred means may be employed for applying a constant, predetermined, adjustable pressure to the work between the electrodes, and it must be understood that the arrangement shown in the accompanying drawings is illustrative only.

The lower electrode 18 is secured in adjustable, fixed position in a chuck 71 projecting upwardly from the transformer blocks 10. The welding current is conducted to that electrode through the wire 16 and the parts are appropriately insulated from the frame of the machine. A post 72 projects upwardly from the frame in spaced relation to the lower electrode and, by means of an adjustable set screw 73 or the like, one piece of the work 74 may be secured in place. The second piece of work 75, which is to be welded to the first, may be positioned between the lower electrode 18 and first piece, and be held temporarily in place by the resilient pressure of the first piece as clamped on the post 72.

The means for applying predetermined pressure to the upper electrode 17 comprises an upwardly and laterally projecting arm 76 having, at its free end, a spring seat 77, surrounding a vertical bore 78 in which the post 79 carrying the electrode 17 is slidably mounted. The electrode 17 is secured to the post 79 by an appropriately insulated chuck 80 to which the wire 19 is attached.

Upon the upper surface of the fixed arm 76, there is a first lever 81 fulcrumed on a bracket 82 and provided with a rearward extension 83. The lever adjacent its forward end carries an upstanding fulcrum bracket 84 for a second lever 85, pivoted thereto at 86. The forward end of the lever 85 is pivoted at 87 to a downwardly hanging yoke 88, carrying, at its lower end, an annular spring seat 89, surrounding the electrode carrying post 79 and slidable with respect thereto. A coiled compression spring 90 is interposed between the annular spring seat 89 carried by the yoke and the lower face of the spring seat 77 on the end of the stationary arm. A second, lighter coil spring 92 is disposed between the upper face of the seat 77 and the free end 93 of the first lever 81. That end of the lever projects through a slot 94 formed in the upper end of the electrode supporting post 79.

Adjacent its rear end 95, the second lever 85 carries an adjustable link 96 which may be secured to the rear extension 83 of the first lever 81 in a plurality of different positions, to vary the force applied to the upper electrode 17.

In the operation of the clamping means, when the work has been positioned above the lower electrode 18, the handle 95 of the lever 85 is moved downwardly, thereby depressing the free end 93 of the lever 81 and collapsing the spring 92, which, as stated above, is considerably weaker than the spring 90. When the upper electrode 17 contacts the work, its further downward movement will be arrested, as well as the further downward movement of the end 93 of the lever 81. As the handle 95 of the other lever is depressed further, the yoke 88 will be raised and the spring 90 compressed a predetermined amount. The degree of compression of the spring 90 determines the amount of pressure applied to the work, through the yoke 88, lever 85, bracket 84, and the free end 93 of lever 81.

The force applied by the upper electrode to the work also may be varied by changing the positions of the fulcrums of the levers or by changing the strength of the spring 90. The particular advantage of the construction disclosed is that when the parts have once been determined and adjusted with accuracy, the same force will be applied to all pieces of work placed between the electrodes, thereby eliminating the human element applying force to the work.

It will be understood that the primary function of the spring 92 is simply to raise the parts to an upwardly disposed inoperative position, thereby providing a space of substantial height between the lower and upper electrodes to facilitate positioning the work on the lower electrodes.

As stated above, the invention is not limited to the details of construction disclosed in the accompanying drawings, but must be construed to cover all changes and modifications coming within the scope of the appended claims and their equivalents.

I claim:

1. A timer for an electric circuit, comprising means for measuring drops of current conducting liquid of predetermined volume, a pair of spaced contact elements in said circuit, means for guiding the measured drops of liquid along a path past said contacts, and means for varying the duration of time in their movements that said drops bridge the space between said contact elements.

2. A timer for an electric circuit, comprising means for measuring small, separated, independent bodies of current conducting liquid of predetermined volume, a pair of spaced contacts, means for successively discharging said bodies of liquid from the measuring means, means for guiding the discharged bodies of liquid along a path past said contacts, and means for varying the duration of time in their movement that said bodies bridge the space and establish electrical communication between said contact elements.

3. A timer for an electric circuit, comprising means for measuring minute bodies of current conducting liquid of predetermined volume, means for dropping the bodies, as independent units, successively, at spaced intervals of time from the measuring means to cause the measured bodies to move under the influence of gravity along a predetermined path, a pair of contact elements spaced along said path, and means for varying the duration of time in their movements that said bodies are in contact with both of said contact elements.

4. A timer for an electric circuit, comprising means for measuring bodies of current conducting liquid of predetermined volume, a pair of spaced contact elements, means for guiding the measured bodies of liquid along a path past said contacts, and means for varying the volume of the bodies of liquid measured by said measuring means, thereby to vary the duration of time that said bodies bridge the space between said contact elements in their movement along said path.

5. A timer for an electric circuit, comprising means for measuring small, separated, independent bodies of current conducting liquid of predetermined volume, a pair of spaced contact elements, means for guiding the measured bodies of liquid along a path past said contacts, and means for varying the spacing of the contacts lengthwise in said path, thereby to vary the duration of time during which said separated, independent bodies bridge the space between the contact elements in the movement of said bodies along said path.

6. A timer for an electric circuit, comprising a receptacle for measuring a drop of current conducting liquid of predetermined, minute volume, a conduit along which the measured drop may flow from said receptacle, and a pair of spaced contacts associated with said conduit and positioned to be electrically connected by said drop during its passage along said conduit.

7. A timer for an electric circuit, comprising a plurality of receptacles of different sizes adapted to measure bodies of current conducting liquid of predetermined, variable volume, a conduit, means for emptying the contents of any of the receptacles into the conduit, a pair of spaced contact elements associated with the conduit and positioned to be electrically connected by the bodies of liquid flowing along the conduit, the volume of each body serving to determine the time that said contacts are so connected.

8. A timer for an electric circuit, comprising a receptacle of predetermined small volume for accurately measuring a small, separate, independent body of current conducting liquid, a conduit adapted to receive all of the liquid from said receptacle and to conduct the same as a unitary body under the influence of gravity, a pair of spaced contacts associated with said conduit and positioned to be electrically connected by said body of liquid during its passage along said conduit, and means for varying the space lengthwise of the conduit between said contacts to vary the duration of time that the body of liquid connects the contacts during its passage along the conduit.

9. A timer for an electric welding circuit, comprising a reservoir having a discharge opening in its bottom for a supply of current conducting liquid, a cylindrical block having a measuring cup formed in its periphery registrable with said discharge opening to receive a measured body of liquid, a discharge conduit below said block, said block being rotatable about its axis to empty the contents of the cup into the conduit, and a pair of spaced contacts associated with said conduit and positioned to be electrically connected by said liquid during its passage along the conduit.

10. A timer for an electric welding circuit, comprising means for holding a supply of current conducting liquid, a rotatably mounted measuring cup adapted to be brought into charging relation to said supply, a conduit positioned to receive the contents of the cup discharged upon rotation of the same, means for admitting air to the bottom of the cup in discharging position to facilitate the discharge of the contents therefrom, and a pair of spaced contacts associated with said conduit and positioned to be electrically connected by the discharged liquid during its passage along said conduit.

11. A timer for an electric welding circuit, comprising a receptacle for a supply of current conducting liquid having a downwardly opening discharge orifice, a cylindrical block below said opening having a central bore and a plurality of measuring cups, each extending from the periphery to said bore, said block being mounted for rotation about and for endwise movement along its axis to register any of said cups with said discharge opening, a conduit below said block positioned to receive the contents of a filled cup upon inversion of the same, an air pipe disposed in the bore of said block and having an opening aligned with said conduit to admit air to the bottom of an inverted cup registering with said conduit, thereby to facilitate the discharge of liquid from the cup to the conduit, and a pair of spaced contacts associated with said conduit and positioned to be electrically connected by the discharged liquid during its passage along said conduit.

12. A device in accordance with claim 11 characterized in that the measuring cups in the block are of varying volumes, whereby bodies of liquid of predetermined, different volume may be caused to travel along said conduit, thereby varying the length of time that said contacts are electrically connected.

13. A device in accordance with claim 9 characterized by the provision of means for varying the spacing between said contacts, thereby to vary the duration of time during which the liquid bridges the space between the contacts in the movement of the liquid along the conduit.

14. A timer for an electric welding circuit, comprising a casing having a horizontally disposed cylindrical chamber therein, a funnel having a downwardly opening passage communicating with the chamber, a discharge conduit in alignment therewith, a compressed air conduit disposed axially in said chamber and having an opening facing the discharge conduit, a cylindrical block in the chamber having an axial bore telescoped on said air conduit, said block having a plurality of measuring cups extending from its periphery to its central bore and each adapted first to register first with the funnel to be filled with a current conducting liquid therefrom, and then to register with the discharge conduit and the air conduit opening to facilitate the discharge of liquid into said conduit, and a pair of spaced contact elements in said conduit adapted to be electrically connected by the quantity of liquid passing therethrough.

15. A timer for an electric circuit comprising a pair of spaced contact elements in said circuit, means for delivering a measured drop of current-conducting liquid, and means for conducting the same along a path past said contacts.

16. An adjustable timer for an electric circuit comprising a pair of spaced contact elements in said circuit, means for conducting a measured drop of current-conducting liquid along a path past said contacts to establish connection between the contacts and complete the circuit, and means for varying the distance between said contacts, thereby to vary the time that the contacts are so connected by said drop during its movement along said path.

17. An adjustable timer for an electric circuit comprising a pair of spaced contact elements in the circuit, a reservoir for a supply of current conducting liquid, means for separating from said supply a small body of liquid and for accurately measuring the body, and means for conducting the separated, measured body of liquid along a path past said contacts to complete the circuit therebetween.

ROY M. WHITE.